United States Patent
Gillispie et al.

(10) Patent No.: US 8,828,115 B2
(45) Date of Patent: Sep. 9, 2014

(54) SUPPORT GRID AND ALIGNMENT APPARATUS FOR A FILTER ELEMENT AND HOUSING

(75) Inventors: Grant Gillispie, Fayetteville, NC (US); Alexander Braithwaite, Climax, MI (US); Michael Desjardins, Kalamazoo, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 396 days.

(21) Appl. No.: 13/219,777

(22) Filed: Aug. 29, 2011

(65) Prior Publication Data

US 2011/0308213 A1 Dec. 22, 2011

Related U.S. Application Data

(63) Continuation-in-part of application No. 12/405,342, filed on Mar. 17, 2009, now Pat. No. 8,142,537.

(51) Int. Cl.
| | |
|---|---|
| *B01D 39/00* | (2006.01) |
| *B01D 46/00* | (2006.01) |
| *B01D 50/00* | (2006.01) |
| *B01D 46/10* | (2006.01) |
| *B01D 46/52* | (2006.01) |

(52) U.S. Cl.
CPC ............ *B01D 46/10* (2013.01); *B01D 2265/06* (2013.01); *B01D 46/521* (2013.01)
USPC .................... 55/499; 55/483; 55/484; 55/485; 55/486; 55/487; 55/497; 55/511; 55/488; 55/521

(58) Field of Classification Search
CPC ... B01D 46/10; B01D 2265/06; B01D 46/521
USPC .................... 55/499, 483–488, 497, 511, 521
See application file for complete search history.

(56) References Cited

U.S. PATENT DOCUMENTS

| | | | |
|---|---|---|---|
| 4,519,823 A | 5/1985 | Kinney et al. | |
| 5,437,701 A | 8/1995 | Townsley | |
| 7,037,354 B1 * | 5/2006 | Dimicelli | ........................ 55/497 |
| 7,404,838 B1 | 7/2008 | Pathak | |
| 2006/0108278 A1 | 5/2006 | Scholl et al. | |
| 2006/0277880 A1 * | 12/2006 | Attassery | ........................ 55/498 |
| 2008/0034974 A1 | 2/2008 | Uemura et al. | |

FOREIGN PATENT DOCUMENTS

WO    WO2005/102496 A2    11/2005

* cited by examiner

*Primary Examiner* — Amber Orlando
(74) *Attorney, Agent, or Firm* — James Hasselbeck

(57) ABSTRACT

An air filter element is provided with an anti-crown support grid on a clean side of the filter media. The support grid includes one or more elongated mounting members provided along periphery portions of the grid and at least one support rib spanning between and secured at opposing ends to the mounting members. The mounting members are embedded within a peripheral seal frame. The support grid may include at least one alignment feature sized, configured and positioned to be receivable into a complimentary feature of a housing so as to positionally lock the filter element and the housing.

9 Claims, 7 Drawing Sheets

SUPPORT GRID AND ALIGNMENT APPARATUS FOR A FILTER ELEMENT AND HOUSING

CROSS REFERENCE TO RELATED APPLICATIONS

The present application is a Continuation in Part (CIP) of currently pending U.S. Utility patent application Ser. No. 12/405,342 filed Mar. 17, 2009, the contents of which are incorporated herein by reference in its entirety and to the fullest extent of the law.

TECHNICAL FIELD

The present invention relates to vehicle engine air intake systems and air filters for such systems and, more particularly, to air filters provided with media reinforcing elements.

BACKGROUND OF THE INVENTION

Internal combustion engines require a source of combustion air. A typical source for combustion air is air drawn from outside of the vehicle, which commonly includes particulate contaminants. An air cleaner including an air filter element is normally provided in the air induction system to capture these particulate contaminants before combustion air is delivered to the vehicle engine.

Air filters include filter media having relatively small pores for air flow therethrough that operate to inhibit the passage of undesired particulate contaminants. Since the presence of a filter media in the intake air stream acts to restrict air flow, air flow through the filter element necessarily produces a pressure differential or pressure drop between the filter element inlet and outlet surfaces (i.e. across the filter media). This air flow induced pressure drop produces deflection forces in the filter media of the filter element. These deflection forces are aligned with the air flow direction and, (for example) in panel type air filters, the deflection forces are typically normal to plane defined by the filter element media. The deflection forces tend to distort, deflect or "crown" the filter element.

Air filter elements are often made of pleated filter paper media secured to a periphery support frame, such as a molded plastic or elastomeric frame. Pleating the filter paper media increases the available filter surface area, while the pleats additionally serve to reinforce the filter media of the filter element against deformation or deflection due to air flow induced forces. In normal operating conditions this is usually sufficient.

Operation of the engine and its associated induction air filter in an adverse climate can substantially increase deflection force loading on the media of the filter element. In cold climates the air filter can draw in snow and ice pellets. The drawn-in snow is blocked by the filter element, accumulates at the dirty side of the filter element and acts to further block air flow through the filter element thereby increasing the pressure drop across the filter element together with an increase in deflection forces acting upon the filter media. Similarly, some varieties of filter media, such as types of filter paper, are prone to absorbing water droplets from the intake air stream, for example if operated in rainy or dense fog conditions. Water wets the filter media, obstructs pores in the media and may act to further obstruct air flow through the media with the resultant further increase in pressure drop and resultant deflection forces.

As can be seen, there is a need for an improved air filter element that provides improved resistance to filter media deformation without unduly increasing filter element cost or complexity.

SUMMARY OF THE INVENTION

In one aspect of the invention, an improved air filter assembly or air cleaner includes an air filter element having at least one filter media, a peripheral seal frame extending circumferentially about and secured to periphery edges of the filter media and an anti-crown support grid positioned at a clean side of the filter media. The support grid includes at least one side rail provided along circumferential periphery portions of the support grid. At least one support rib is provided spanning between and secured at opposing ends to the side rails. A plurality of frame attachment members are spaced along, secured to and extend outwardly from the support rails. The attachment members are configured and adapted to be moldably embedded into the seal frame to secure the support grid to the seal frame. At least one alignment feature is provided along at least one of the side rails. The alignment feature is sized, configured and positioned to be receivable into a complimentary feature of the housing to lock the relative positions of the housing and the filter element.

In another aspect of the invention, the alignment feature is or includes an elongated alignment rib spanning across an interior of the support grid and secured at opposing ends to the side rails. The elongated alignment rib projecting outwards in at least one portion from a plane in which the support grid generally lies.

In another aspect of the invention, the alignment feature includes at least one alignment tab secured to the side rails and projecting outwards from a plane in which the support grid generally lies.

In another aspect of the invention, the filter media is a pleated filter media and the support ribs are positioned to have an angular alignment different from an angular alignment of the pleats.

In another aspect of the invention, a first group of support ribs and a second group of support ribs are provided. Support ribs in the first rib group are aligned in a first direction and positioned in a spaced parallel fashion to each other. Support ribs in the second rib group are aligned in a second direction and position in a spaced parallel fashion relative to each other. The first and the second directions are chosen such that an angle between the first and second directions is between 10 and 90 degrees.

In another aspect of the invention, the support ribs are sized and spaced such that air flow spaces between the support ribs has an accumulated area of at least 95% of the area enclosed by the seal frame.

In another aspect of the invention, the housing includes a first housing portion and a mateable second housing portion. The housing portions are configured to receive and close about the air filter element. The first housing portion includes an alignment receptor having a concave receptor sized and configured to receive a portion of the alignment feature so as to lock alignment of the filter element with the first housing portion.

In another aspect of the invention, an improved air filter assembly includes an air filter element having at least one filter media having a plurality of spaced folds forming zigzag pleats in said filter media. A peripheral elastomeric seal frame extends circumferentially about and is secured onto periphery edges of the filter media. A substantially planar anti-crown support grid is arranged at and extends across a clean side face of the filter media. The support grid includes at least one elongated mounting member arranged proximate to outer edges of the anti-crown support grid with the mount members each aligned parallel to the plane of the anti-crown support grid. The elongated mounting members are aligned with and embedded within the seal frame. A first support rib group includes at least one elongated support rib extending parallel to pleat folds and spanning across the clean side face with the ribs each securely affixed at opposing ends to said at least one elongated mounting members. A second support rib group includes at least one elongated support rib abutting against and extending across multiple pleat folds at the clean side face, with the ribs of the second support rib group each securely affixed at opposing ends to at least one elongated mounting member. The ribs of said second support rib group span across and connect to at least a portion of the ribs of said first support rib group.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof may be best understood with reference to the following description, taken in conjunction with the accompanying drawings. The drawings show a form of the invention that is presently preferred; however, the invention is not limited to the precise arrangement shown in the drawings.

Figure 1A:
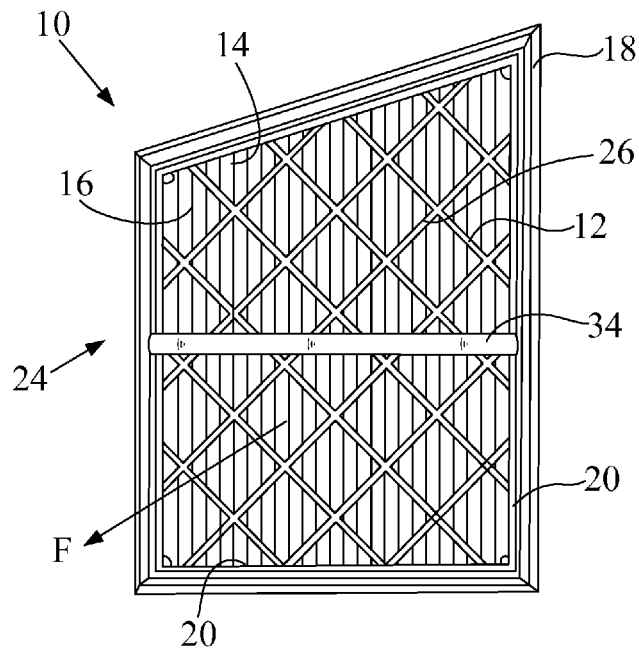
FIG. 1A is a plan view of the clean side of an air filter element equipped with the anti-crown support grid, consistent with the present invention.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present invention.

DESCRIPTION OF THE PREFERRED EMBODIMENTS

Before describing in detail embodiments that are in accordance with the present invention, it should be observed that the embodiments reside primarily in combinations of method steps and apparatus components related to an apparatus and method for a support grid for a filter element and alignment features and means. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention generally relates to an improved air filter element incorporating an anti-crown support grid that is molded into the seal frame of the filter element as well as an air cleaner housing equipped with complimentary alignment features. The support grid provides mechanical support to the filter media to strengthen the filer element media from distorting or "crowning" under the influence of air flow induced forces. The support grid may be further reinforced by mating features provided in the air cleaner housing that supportively mate with the alignment features that may be provided on the support grid. In the event of snow pack accumulation or other obstruction of the air filter media, the invention provides increased resistance to crowning or distortion of the filter media, therefore reducing the chance of a mechanical failure of the filter element.

FIG. 1A presents plan view of the clean side (air outlet side) of an improved air filter element 10 advantageously equipped with the anti-crown support grid 12, consistent with the present invention. Air filter element 10 includes a peripheral seal frame 18 extending circumferentially about the periphery edges of the pleated filter media 14. Other types of filter media than pleated filter media may also be used without deviating from the inventive disclosure herein. The pleated filter media 14 is supportively and sealably secured along its edges to the peripheral seal frame 18 such that air is not permitted to flow between the pleated filter media 14 and the peripheral seal frame 18.

Figure 1B:
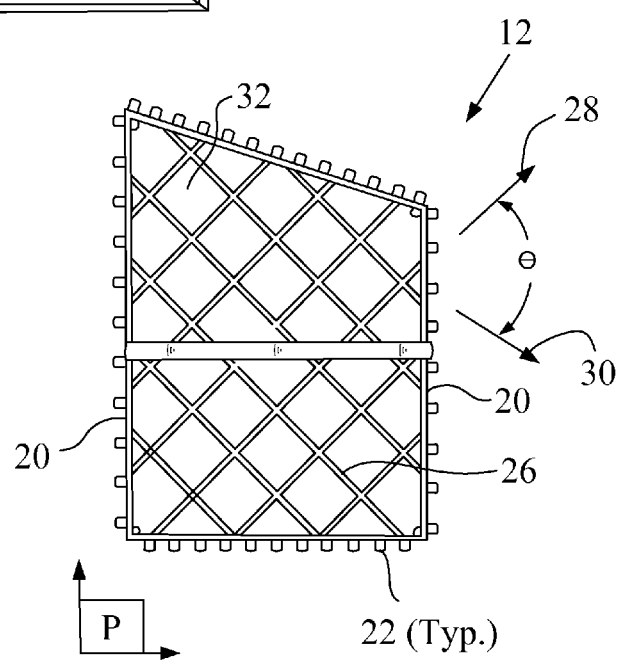
FIG. 1B is a plan view of one embodiment of the anti-crown support grid, viewed from the side facing the filter media, consistent with the present invention.
Figure 1C:
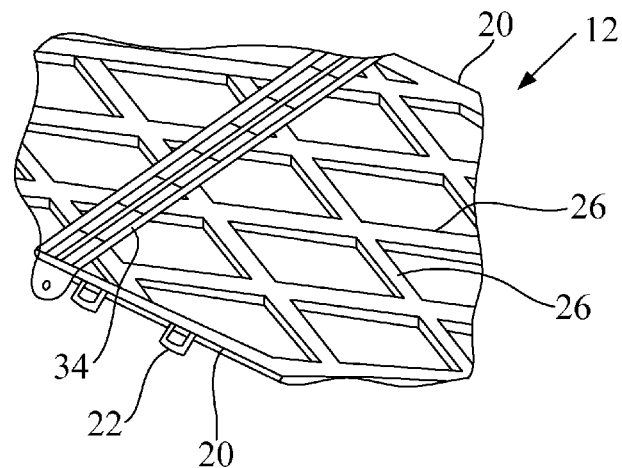
FIG. 1C is an enlarged view of a portion of the support grid of FIG. 1B, consistent with the present invention.

FIG. 1B presents a plan view of one embodiment of the anti-crown support grid 12 as viewed from the side normally facing the filter media 14, consistent with the present invention. FIG. 1C provides an enlarged view of a portion of the support grid 12 of FIG. 1B, consistent with the present invention. The anti-crown support grid 12 is closed about periphery side portions by side rails 20. Spaced along, secured to and extending outwardly from the side rails 20 are a plurality of frame attachment members 22. Frame attachment members 22 are configured to be embedded by a molding process into portions of the peripheral seal frame so as to secure the anti-crown support grid 12 onto the peripheral seal frame 18 in position against the clean side 24 of the filter media 14. The seal frame member includes an elastomeric seal material. A plurality of support ribs 26 extend across the opening between the side rails 20 and are secured at their opposing ends to the side rails 20 so as to form a support grid structure configured to support the filter media 14 and to actively resist deflection forces F induced into the filter media 14 such as due to air flow through the filter media.

The anti-crown support grid is preferably formed of a structurally stable, tensile elongation resistant thermoplastic material, although the support grid may alternately be made of metallic materials such as aluminum or steel. The support ribs have a first rib group that is preferably aligned in a first direction 28 and a second rib group that is preferably aligned in a second direction 30 substantially normal (θ is approximately 90 degrees) relative to the first direction 28. The invention does not require the second direction 30 to be normal to the first direction 28. It is envisioned that instead θ may be any angle of 10 degrees to 90 degrees, with larger angles in the range preferred.

If the filter media 14 is a pleated filter media, it is preferred that the first direction 28 and second direction 30 be chosen such that the support ribs 26 do not directionally align with the direction of the pleats 16 so that the support ribs always supportively bridge across ridges of the pleats 16 rather than to fall within gaps or valleys between the pleats 16.

To prevent unintended obstruction of air flow through the filter element 10, it is preferred that the support ribs are sized and spaced such that the air flow spaces 32 between the support ribs 26 have an area at least 95% of the area enclosed by the peripheral seal frame 18.

At least one alignment feature is provided along at least one side rail 20 of the anti-crown support grid 12. It is preferred that the alignment feature be provided as at least one elongated alignment rib 34 spanning across the interior of the support grid 12 and secured at opposing ends to side rails 20 of the support grid 12. It is further preferred that the elongated alignment rib be configured with a substantially larger cross section relative to the support ribs so as to provide increased resistance to bending or flexing of the support grid under load. It is still further preferred that the elongated alignment ribs be spaced apart in a parallel arrangement so as to divide the span length of each pleat into substantially equal lengths defined between adjacent alignment ribs or an alignment rib and a side rail.

FIG. 1C, in particular, shows one embodiment of an anti-crown support grid 12 in which the alignment feature is realized with an elongated alignment rib 34 having a sufficient cross section configured to resist flexure so as to provide additional support to filter media 14.

Figure 1D:
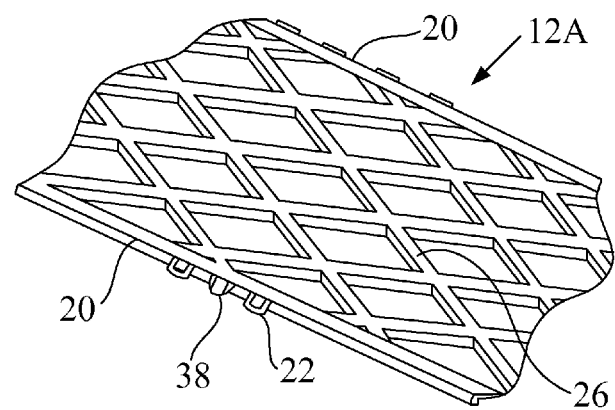
FIG. 1D is an enlarged view of a portion of another embodiment of the support grid, consistent with the present invention.

FIG. 1D depicts an enlarged view of another embodiment of an anti-crown support grid 12A in which the alignment feature is alternately realized as an alignment tab 38. At least one alignment tab 38 is provided, each alignment tab 38 is secured to a side rail 20 and configured to project outwards from a plane P in which the anti-crown support grid 12 or 12A generally lies. The alignment tab 38 is configured to provide the same filter element alignment function (described later below) as provided by the elongated alignment rib 34, but lacking the alignment rib's ability to provide enhanced resistance to bending of the support ribs 26 under load, therefore it may provide less support to the filter media 14 in resisting deformation or deflection due to the action of deflective forces F.

Figure 2A:
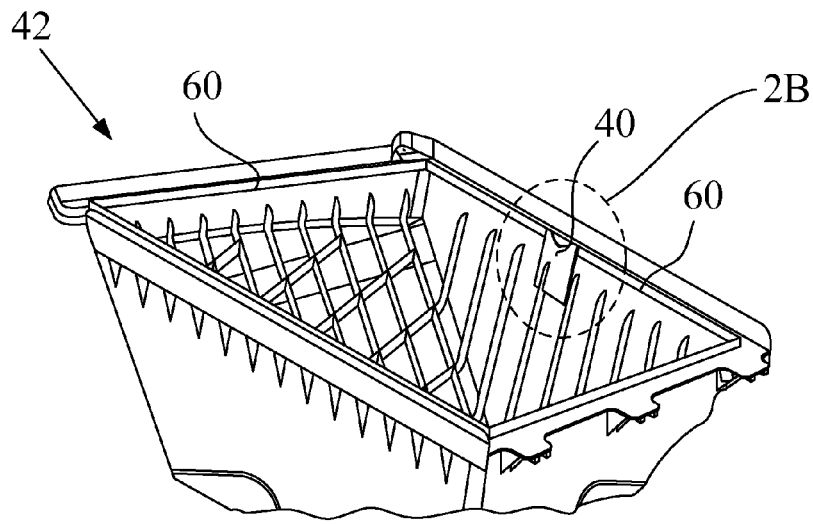
FIG. 2A is a perspective view of an air cleaner housing cover depicting one embodiment of a grid alignment feature, consistent with the present invention.
Figure 2B:
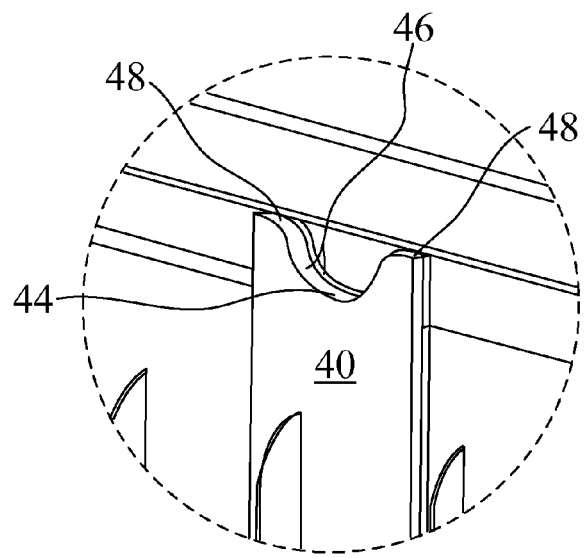
FIG. 2B is an enlarged view of the grid alignment feature of FIG. 2A, consistent with the present invention.

FIG. 2A provides a perspective view of the interior of a first air cleaner housing portion 42 provided with an embodiment of a grid alignment receptor 40, consistent with the present invention. FIG. 2B is an enlarged view of the alignment receptor 40 of FIG. 2A, consistent with the present invention. The first air cleaner housing portion 42 may, in some embodiments, be an air cleaner cover while in other embodiments it may be an air cleaner housing base. In any case, the alignment receptor 40, according to the present invention, is typically provided in the air cleaner housing portion that faces the clean side 24 of the air filter element 10. The alignment receptor 40 includes a concave receptacle 44 which in some embodiments may include a concave circular arc portion 46 extended at opposing ends by blended curves 48. The blended curves 48 are configured to smoothly guide the filter element alignment features (such as alignment tab 36 or elongated alignment rib 34) into the concave circular arc portion 46 of the alignment receptor so as to lock alignment of the filter element 10 with the first air cleaner housing portion 42.

FIGS. 3A-3D provide partial sectional views of the interior of an air cleaner housing 50 and installed filter element 10 incorporating features of the present invention. FIGS. 3A-3D illustrate the interaction between the alignment receptor 40 and one possible embodiment of the alignment feature (illustrated embodiment is the elongated alignment rib 34) during closure of the air cleaner housing 50. Only a portion of the sidewalls of the air cleaner housing 50 are shown to provide a clearer view of the integration between the alignment feature and alignment receptor. The air cleaner housing 50 has a second air cleaner housing portion 52 configured to receive air filter element 10. The air cleaner housing 50 includes a first air cleaner housing portion 42 which is configured to close over the filter element 10 and mate with either or both the peripheral seal frame 18 of the filter element and sidewalls of the second air cleaner housing portion 52 so as to provide a substantially dust tight and air tight seal between the air cleaner housing portions 42, 52 and the filter element 10.

Figure 3A:
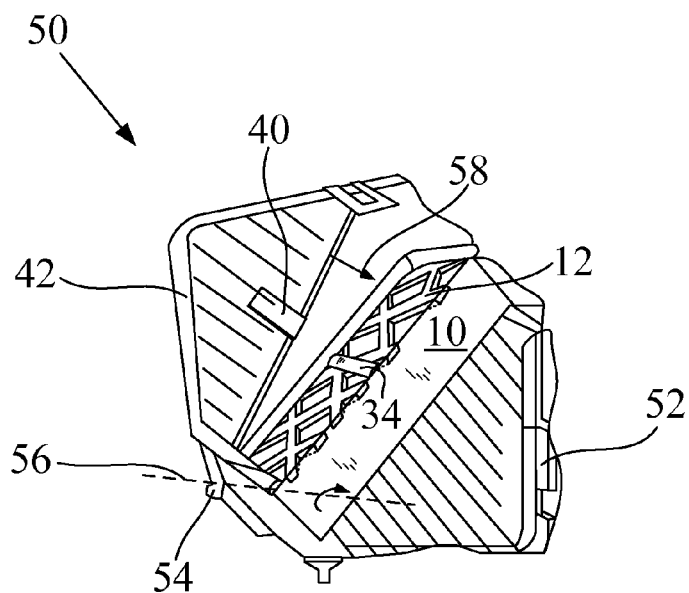
FIGS. 3A-3D are partial sectional views of an air cleaner housing and filter element incorporating features of the present invention and illustrating operation of the filter alignment features.

Some embodiments of air cleaner housings may include partially hingeable tab and slot features 54. In FIG. 3A the first air cleaner housing portion 42 includes a partially hingable tab feature configured to be received into a slot feature of the second air cleaner housing portion 52. When assembling the first air cleaner housing portion 52 onto the second air cleaner housing portion 52, the tab is first inserted into the slot feature to partially hingeably secure the first housing portion 42 to the second housing portion 52. Once secured, the first housing portion may be rotated about a hinge axis 56 to move the first air cleaner housing portion 42 towards a closed position with the second air cleaner housing portion 52 as shown by arrow 58. As illustrated in FIG. 3A, the clean side 24 of the filter element 10 with the anti-crown support grid 12 including the elongated alignment rib 34 faces the first air cleaner housing portion 42.

Figure 3B:
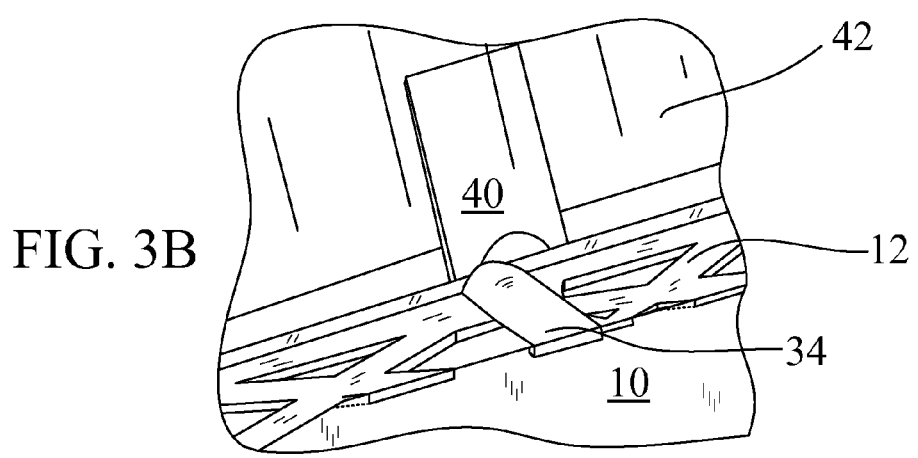
Figure 3C:
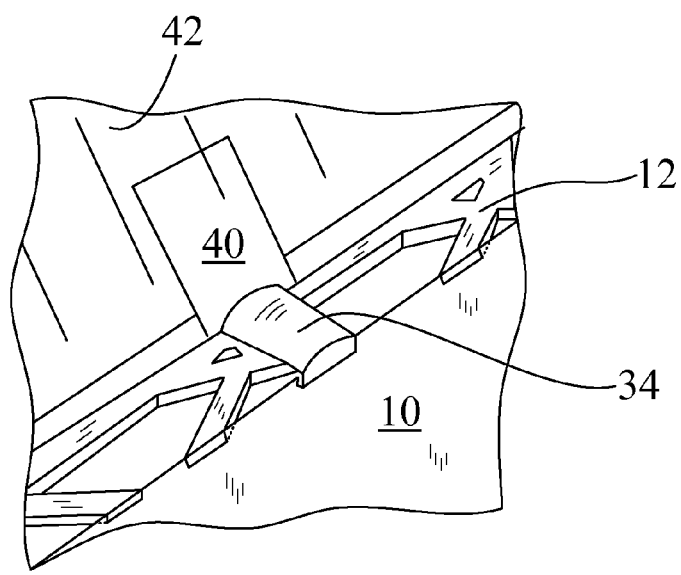
Figure 3D:
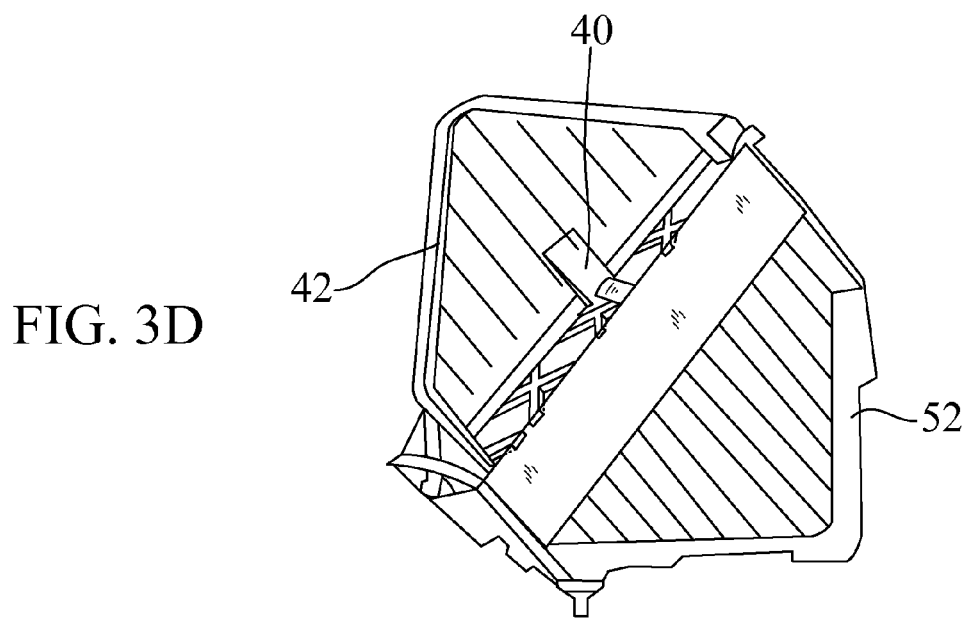

Referring now to FIG. 3B, it may be that while the first air cleaner housing portion 42 is closing onto the second air cleaner housing portion 52, that a misalignment is present between the first air cleaner housing portion 42 and the filter element 10. A potential misaligned condition is shown in FIG. 3B in which a portion of the elongated alignment rib 34 contacts a blended curve 48 portion (see FIG. 2B) of the alignment receptor 40 rather than being received into the concave circular arc portion 46 of the alignment receptor 40. As discussed earlier, the alignment receptor 40 includes a blended curve 48 advantageously shaped and configured to ultimately guide the alignment features (in the illustrated embodiment the elongated alignment rib 34) into the concave circular arc portion 46 of the alignment receptor 40. One way to accomplish this is for the first air cleaner housing portion 42 to slide relative to the second air cleaner housing portion 52; this movement is permitted by the partially rotatable tab and slot feature 54 as the tab is free to slide within the slot. Such tab and slot features are common attachment means used in the art. As the first air cleaner housing portion 42 is urged by the interaction of the elongated alignment rib 34 in the alignment receptor 40, the first air cleaner housing portion 42 is repositioned for successful sealable closure onto the filter element 10 and second air cleaner housing portion 52, as shown in FIGS. 3C and 3D.

Referring again to FIG. 2A. The first air cleaner housing portion 42 may advantageously include a seal ledge 60 configured to supportively contact the side rails 20 of the anti-crown alignment grid 12 when the air cleaner housing 50 is in a fully closed position (position illustrated in FIGS. 3C and 3D). The seal ledge 60 as well as the alignment receptor 40 are then operable to support the anti-crown support grid 12 and its filter media 14 by transferring air flow induced deflection forces F (see FIG. 1A) onto the first air cleaner housing portion 42.

Figure 4A:
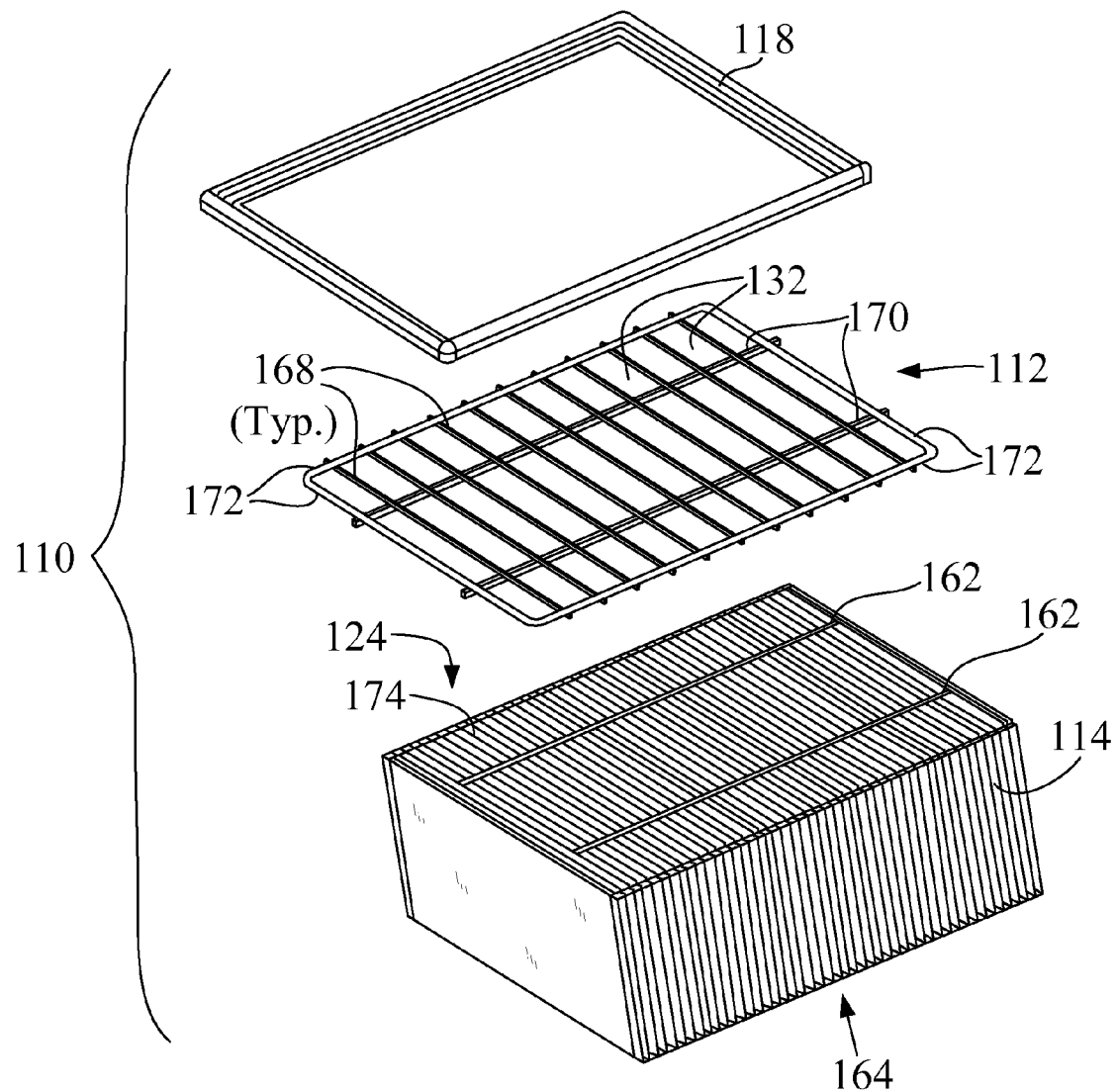
FIG. 4A is an exploded perspective assembly view of the another embodiment of the anti-crown support grid, consistent with the present invention.
Figure 4B:
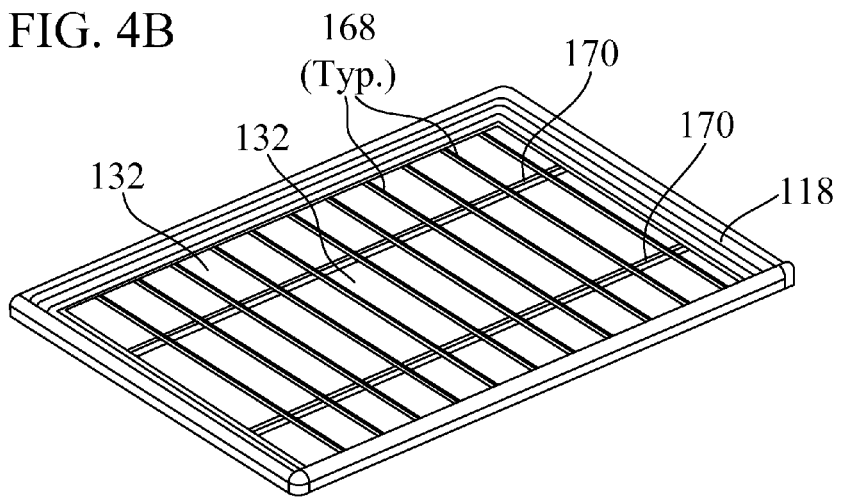
FIG. 4B is a perspective view of the embodiment of FIG. 4A showing the anti-crown support grid embedded into the peripheral seal frame, consistent with the present invention.
Figure 4C:
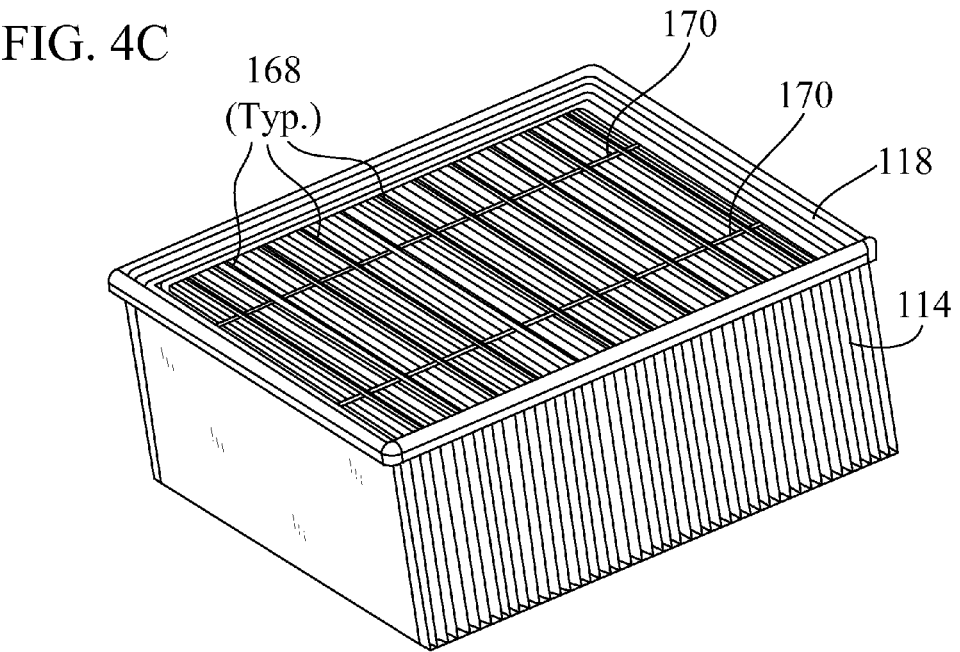
FIG. 4C is an assembled perspective view of the embodiment of FIG. 4A.

The discussion now turns to FIGS. 4A through 4C. In FIGS. 4A through 4C like components to those discussed in FIGS. 1A through 1D are identified with numeric references incremented by 100.

Referring now to FIGS. 4A-4C. FIG. 4A presents an exploded perspective assembly view of the another embodiment of the anti-crown support grid 112 of FIGS. 1A through 1D. Components are depicted in an exploded view for easier understanding of the structure of each component. FIG. 4B is a perspective view of the embodiment of FIG. 4A showing the anti-crown support grid 112 embedded into the peripheral seal frame 118 and shown without the filer media 114 for clarity. FIG. 4C is a fully assembled perspective view of the embodiment of FIG. 4A depicting the unitary one-piece replaceable filter element 110.

The air filter element 110 includes one or more sheets of filter media 114 which are folded into spaced parallel folds to form a zigzag pleated filter media sheet 114. The filter media 114 has a clean side 124 visible in FIG. 4A and an opposing dirty side 164. Airflow flows through the filter media 114 from the dirty side 123 to the clean side 164. Airflow through the filter media 114 results in deflection forces acting upon the filter media due to the pressure drop developed across the filter media, as discussed earlier with FIG. 1A. As discussed earlier, the anti-crown support grid 112 provides mechanical support to the filter media 114 to strengthen the filer element media 114 from distorting or "crowning" under the influence of air flow induced forces "F" (see FIG. 1A).

A substantially planar anti-crown support grid 112 is arranged at and extends across the clean side face 124 of the filter media 114. The anti-crown support grid 112 is shown with elongated mounting members 172 arranged at the outer edges of the anti-crown support grid 112. The elongated mounting members 172 are depicted as connected end to end to form a continuous boundary encircling the anti-crown support grid 112, although in other embodiments the elongated mounting members 172 may not be connected end to end and may be spaced apart from each other.

The mount members 166 are each aligned parallel to the plane of the anti-crown support grid 112. The elongated mounting members 166 are positioned and aligned so as to be embedded within and hidden within the elastomeric seal frame 118 of the filter element 110. The anti-crown support grid 112 includes a first support rib group 168 of elongated support ribs extending parallel to the pleat folds 174 of the filter media 114 and spanning across the clean side face 124 of the filter media 114. The support ribs of the first support rib group 170 are each securely affixed at opposing ends to the elongated mounting members 172 circumferentially surrounding the substantially planar anti-crown support grid 112. A second support rib group 170 includes a plurality of spaced elongated support ribs which are arranged to abut against and extend across the multiple pleat folds 174 at the clean side face 124 with the ribs of the second support rib group 170 each securely affixed at opposing ends of each rib to the elongated mounting members 166. The ribs of the second support rib group 170 spans across and preferably are fixedly secured to the ribs of said first support rib group 168 providing a rigid frame structure to support the filter media 114 against crowning or deflection. The anti-crown support grid 112 is preferably formed of a structurally stable, tensile elongation resistant thermoplastic material, although the support grid may alternately be made of metallic materials such as aluminum or steel.

As discussed earlier the peripheral seal frame 118 extends circumferentially about and is secured onto the peripheral edges of the filter media 114. The substantially planar anti-crown support grid 112 is embedded into the peripheral seal frame 118 such that the peripheral seal frame 118 with the anti-crown support grid 112 and the filter media 114 are embodied as a single piece unitary filter element 110 which is installed and replaced as a single component.

The elongated support ribs in the first support rib group 168 are elongated in a first direction and positioned in a spaced parallel fashion relative to each other on the clean side face 124 of the filer media 114. The support ribs in the second support rib group 170 are elongated in a second direction and positioned in a spaced parallel fashion relative to each other on the clean side face 124 of the filter media 114. The first and said second directions are chosen such that an angle between said first and second directions is between 10 and 90 degrees. Preferably the support ribs in the first support rib group 168 are arranged perpendicular to the elongated ribs in the second support rib group 170. This is preferred but not required.

The substantially planar anti-crown support grid 112 may be provided with one or more alignment features, for example the elongated alignment rib 34 discussed earlier with FIG. 1A or the alignment tabs 38 of FIG. 1D. The alignment features, when present, are secured and affixed onto the elongated mounting members 172 (which in this embodiment replaces the side rails 20 of FIGS. 1A through 1D). The function of the alignment features in positioning and aligning the filter element within the filter housing were discussed earlier with FIGS. 2A-3D, this earlier disclosure applies to the embodiment of FIGS. 4A-4C also and is not repeated here. The alignment features (34 or 38) are secured affixed to the mounting member(s) with the alignment features sized, configured and positioned to be received into a grid alignment receptor (40, FIG. 2A) of the filter housing (42, FIG. 2A), as discussed earlier.

To minimize restriction of the air flow through the filter element 110, the support ribs of the second support rib group 170 may be aligned parallel to and may lie directly upon the glue beads 162 provided on the clear air face 124 of the filter media 114. The glue beads 162 may be provided to lock or maintain spacing between adjacent pleats of the filter media 114 so as to provide uniform pleat spacing and prevent pleats from bunching or otherwise restriction airflow.

Features of a suitable filter housing were discussed earlier with FIGS. 2A through 3D and are not repeated with this embodiment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An improved air filter assembly comprising:
an air filter element including
at least one filter media having a plurality of spaced folds forming zigzag pleats in said filter media, said pleated filter media having a clean side face and an opposing dirty side face;
a peripheral seal frame extending circumferentially about and secured to periphery edges of said filter media, said seal frame including elastomeric material;
a substantially planar anti-crown support grid arranged at and extending across a clean side face of said filter media, said support grid including:
at least one elongated mounting member arranged proximate to outer edges of said anti-crown support grid, said at least one mounting member each aligned parallel to said plane of said anti-crown support grid, said elongated mounting members aligned with and embedded within said seal frame;
a first support rib group comprising at least one elongated support rib extending parallel to pleat folds and spanning across said clean side face, said ribs of said first support rib group each securely affixed at opposing ends to said at least one elongated mounting member;
a second support rib group comprising at least one elongated support rib abutting against and extending across multiple pleat folds at said clean side face, said ribs of said second support rib group each securely affixed at opposing ends to said at least one elongated mounting members,
wherein ribs of said second support rib group span across and connect to at least a portion of said ribs of said first support rib group;
wherein at least one alignment feature provided along at least one of said at least one mounting members, said alignment feature is sized, configured and positioned to be receivable into a complimentary feature of a housing;
wherein said at least one alignment feature comprises an elongated alignment rib spanning across the clean air face of the filter media and affixed proximate to its opposing ends to said at least one elongated mounting members, said elongated alignment rib having a substantially larger cross section relative to said support ribs.

2. The improved air filter assembly according to claim 1, wherein
said support ribs in said first support rib group are aligned in a first direction and positioned in a spaced parallel fashion relative to each other,
wherein support ribs in said second support rib group are aligned in a second direction and positioned in a spaced parallel fashion relative to each other; and
wherein said first and said second directions are chosen such that an angle between said first and second directions is between 10 and 90 degrees.

3. The improved air filter assembly according to claim 2, wherein
said first rib group is aligned substantially perpendicular to said second rib group.

4. The improved air filter assembly of claim 3, wherein said support ribs are sized and spaced such that open air flow spaces between said support ribs has an accumulated area of at least 95% of an area enclosed by said seal frame.

5. The improved air filter assembly according to claim 3, wherein
said pleated filter media includes glue beads affixed onto, extending across and supportively interconnecting adjacent pleat folds of the filter media, said glue beads maintaining spacing of a said spaced folds,
wherein a portion of said ribs of said second support rib group are aligned parallel to and line directly on respective ones of said glue beads.

6. The improved air filter assembly according to claim 5, wherein
at least one alignment feature provided along at least one of said at least one mounting members, said alignment feature is sized, configured and positioned to be receivable into a complimentary feature of a housing.

7. The improved air filter assembly according to claim 1, wherein
said elongated mounting members are affixed to each other end to end forming a continuous frame circumferentially surrounding outer edges of said anti-crown support grid.

8. The improved air filter assembly according to claim 1, wherein
wherein said elongated mounting members are completely embedded within and hidden within said seal frame.

9. An air filter assembly comprising:
an air filter element including
at least one filter media having a plurality of spaced folds forming zigzag pleats in said filter media, said pleated filter media having a clean side face and an opposing dirty side face;
a peripheral seal frame extending circumferentially about and secured to periphery edges of said filter media, said seal frame including elastomeric material;
a substantially planar anti-crown support grid arranged at and extending across a clean side face of said filter media, said support grid including:
at least one elongated mounting member arranged proximate to outer edges of said anti-crown support grid, said at least one mounting member each aligned parallel to said plane of said anti-crown support grid, said elongated mounting members aligned with and embedded within said seal frame;

a first support rib group comprising at least one elongated support rib extending parallel to pleat folds and spanning across said clean side face, said ribs of said first support rib set each securely affixed at opposing ends to said at least one elongated mounting member;

a second support rib group comprising at least one elongated support rib abutting against and extending across multiple pleat folds at said clean side face, said ribs of said second support rib group each securely affixed at opposing ends to said at least one elongated mounting member, wherein ribs of said second support rib group span across and connect to at least a portion of said ribs of said first support rib group, wherein said support ribs in said first support rib group are aligned in a first direction and positioned in a spaced parallel fashion relative to each other, wherein support ribs in said second support rib group are aligned in a second direction and position in a spaced parallel fashion relative to each other, wherein said first and said second directions are chosen such that an angle between said first and second directions is between 10 and 90 degrees, wherein said support ribs are sized and spaced such that air flow spaces between said support ribs has an accumulated area of at least 95% of an area enclosed by said seal frame, wherein said elongated mounting members are completely embedded within and hidden within said seal frame;

wherein at least one alignment feature provided along at least one of said at least one mounting members, said alignment feature is sized, configured and positioned to be receivable into a complimentary feature of a housing;

wherein said at least one alignment feature comprises an elongated alignment rib spanning across the clean air face of the filter media and affixed proximate to its opposing ends to said at least one elongated mounting members, said elongated alignment rib having a substantially larger cross section relative to said support ribs; and a housing comprising:
 a first housing portion; and
a second housing portion configured to closeably mate with said first housing portion, said housing portions configured to receive and close about said air filter element.

* * * * *